(12) United States Patent
Patel et al.

(10) Patent No.: US 9,166,723 B2
(45) Date of Patent: Oct. 20, 2015

(54) NETWORK FRAGMENTATION MEASUREMENT IN AN OPTICAL WAVELENGTH DIVISION MULTIPLEXING (WDM) NETWORK

(71) Applicant: NEC Laboratories America, Inc., Princeton, NJ (US)

(72) Inventors: Ankitkumar Patel, Monmouth Junction, NJ (US); Philip Nan Ji, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/177,654

(22) Filed: Feb. 11, 2014

(65) Prior Publication Data
US 2014/0226986 A1   Aug. 14, 2014

Related U.S. Application Data

(60) Provisional application No. 61/764,568, filed on Feb. 14, 2013.

(51) Int. Cl.
*H04J 14/00* (2006.01)
*H04J 14/02* (2006.01)
*H04L 12/721* (2013.01)

(52) U.S. Cl.
CPC .......... *H04J 14/021* (2013.01); *H04J 14/0257* (2013.01); *H04L 45/12* (2013.01)

(58) Field of Classification Search
CPC ...... H04B 14/021; H04L 45/00; H04L 45/12; H04J 14/0227; H04J 14/0257; H04J 14/0258; H04J 14/0269; H04J 14/02; H04J 14/021; H04Q 2011/0073; H04Q 2011/0086

USPC .......... 398/83, 57, 79, 68, 8, 25, 34
See application file for complete search history.

(56) References Cited

U.S. PATENT DOCUMENTS

| | | | | |
|---|---|---|---|---|
| 7,020,087 B2 * | 3/2006 | Steinberg et al. | ............. | 370/238 |
| 7,236,699 B2 * | 6/2007 | Beshai et al. | ................... | 398/45 |
| 7,813,281 B2 * | 10/2010 | Bolt et al. | ....................... | 398/57 |
| 8,467,681 B2 * | 6/2013 | Lee et al. | ........................ | 398/48 |
| 8,515,280 B1 * | 8/2013 | Li et al. | ............................. | 398/58 |
| 8,582,490 B2 * | 11/2013 | Qiu et al. | ..................... | 370/312 |

(Continued)

OTHER PUBLICATIONS

ITU-T G.694.1, "Spectral grids for WDM applications: DWDM frequency grid," May 2002.

(Continued)

*Primary Examiner* — Hibret Woldekidan
(74) *Attorney, Agent, or Firm* — Akitaka Kimura; Joseph Kolodka

(57) ABSTRACT

A method implemented in a network apparatus used in a wavelength division multiplexing (WDM) optical network is disclosed. The method includes (a) finding K-shortest routes between each node pair (s, d), where s, d∈V and |V|≤K, where V is a set of reconfigurable optical add-drop multiplexer (ROADM) nodes, (b) selecting unconsidered node pair (s, d), (c) selecting unconsidered route k between nodes s and d out of the K-shortest routes, (d) finding a bit map of route k by performing bit-wise logical AND operation on bit vectors of fibers along route k, (e) selecting unconsidered line rate l out of offered set L of line rates, and (f) finding a probability $\alpha_l^{s,d,k}$ of provisioning a connection with line rate l. Other apparatuses, systems, and methods also are disclosed.

10 Claims, 5 Drawing Sheets

(56) References Cited

U.S. PATENT DOCUMENTS

| | | | |
|---|---|---|---|
| 8,781,328 B2* | 7/2014 | Patel et al. | 398/79 |
| 8,873,962 B2* | 10/2014 | Patel et al. | 398/79 |
| 8,909,043 B2* | 12/2014 | Patel et al. | 398/57 |
| 8,977,123 B2* | 3/2015 | Patel et al. | 398/49 |
| 2003/0002506 A1* | 1/2003 | Moriwaki et al. | 370/392 |
| 2010/0158528 A1* | 6/2010 | Resende et al. | 398/79 |
| 2011/0286746 A1* | 11/2011 | Ji et al. | 398/83 |
| 2011/0318004 A1* | 12/2011 | Bruno | 398/45 |
| 2012/0070148 A1* | 3/2012 | Patel et al. | 398/49 |
| 2012/0070150 A1* | 3/2012 | Patel et al. | 398/79 |
| 2013/0070617 A1* | 3/2013 | Clow et al. | 370/252 |
| 2014/0099118 A1* | 4/2014 | Zhang et al. | 398/79 |
| 2014/0178066 A1* | 6/2014 | Patel et al. | 398/45 |
| 2014/0226985 A1* | 8/2014 | Patel et al. | 398/79 |
| 2014/0233956 A1* | 8/2014 | Zami | 398/79 |
| 2014/0379926 A1* | 12/2014 | Patel et al. | 709/226 |
| 2015/0043911 A1* | 2/2015 | Patel et al. | 398/48 |
| 2015/0043915 A1* | 2/2015 | Patel et al. | 398/68 |
| 2015/0046592 A1* | 2/2015 | Patel et al. | 709/226 |

OTHER PUBLICATIONS

A. N. Patel, P. N. Ji, J. P. Jue, and T. Wang, "Defragmentation of Transparent Flexible Optical WDM (FWDM) Networks," Proceeding of OFCNFOEC, No. OTuI8, Mar. 2011.

F. Cugini, M. Secondini, N. Sambo, G. Bottari, G. Bruno, P. Iovanna, and P. Castoldi, "Push-Pull Technique for Defragmentation in Flexible Optical Networks," Proceeding of OFCNFOEC, No. JTh2A.40, Mar. 2012.

K. Wen, Y. Yin, D. Geisler, S. Chang, and S. J. Ben Yoo, "Dynamic On-demand Lightpath Provisioning Using Spectral Defragmentation in Flexible Bandwidth Networks," Proc. of ECOC, No. Mo.2.K.4, 2011.

X. Yu, J. Zhang, Y. Zhao, T. Peng, Y. Bai, D. Wang, and X. Lin, "Spectrum Compactness based Defragmentation in Flexible Bandwidth Optical Networks," Proc. of OFCNFOEC, No. JTh2A.35, 2012.

X. Wang, Q. Zhang, I. Kim, P. Palacharla, and M. Sekiya, "Utilization Entropy for Assessing Resource Fragmentation in Optical Networks," Proc. of OFCNFOEC, No. OTh1A.2, 2012.

\* cited by examiner

NETWORK FRAGMENTATION MEASUREMENT IN AN OPTICAL WAVELENGTH DIVISION MULTIPLEXING (WDM) NETWORK

This application claims the benefit of U.S. Provisional Application No. 61/764,568, entitled "Procedure to Measure Network Fragmentation in Optical WDM Networks," filed on Feb. 14, 2013, the contents of which are incorporated herein by reference.

This application is related to commonly assigned application Ser. No. 14/177,667, entitled "A Virtual Network Embedding Procedure in an Optical Wavelength Division Multiplexing (WDM) Network," filed concurrently herewith, the contents of which are incorporated herein by reference.

BACKGROUND OF THE INVENTION

The present invention relates to wavelength division multiplexing (WDM) optical networks and, more particularly, to measurement of spectral fragmentation in the WDM networks.

In wavelength division multiplexing (WDM) optical networks, upon an arrival of a demand requesting a line rate between end nodes, an optical channel is established by allocating finite amount of spectrum on all fibers along the route. If an intermediate node along the route does not support wavelength conversion capability, then the channel must follow the wavelength continuity constraint, which is defined as an allocation of the same center wavelength to the channel, and the spectral continuity constraint, which is defined as an allocation of the same amount of spectrum to the channel in the ingress and egress fibers of a node. To support multiple such channels over a fiber, the spectral conflict constraint must be satisfied, which is defined as an allocation of non-overlapping spectrum to the channels routes over the same fiber.

Conventionally to address interoperability issues, the International Telecommunication Union Telecommunication Standardization Sector (ITU-T) has standardized fixed channel spacing [1]. The network that follows the ITU-T standard is referred to as fixed grid network as shown in FIG. 1(a). Fixed grid networks may not optimize spectral efficiency while supporting line rates with heterogeneous granularity for ever increasing bandwidth demands. Recently, flexible grid network architecture (as shown in FIG. 1(b)) is introduced in which flexible amount of spectrum is assigned to channels based on the requirements of requested bandwidth, transmission reach, and offered modulation formats. Flexible grid networks highly optimize network spectral efficiency. However, dynamic arrival and departure of channels with heterogeneous spectrum requirements causes fragmentations in spectrum (as shown in FIG. 2), and the network can no longer be in its optimal state. The state of fragmented spectrum in a network is referred to as network fragmentation. Network fragmentation is a serious issue in fixed and flexible grid networks. Spectral fragmentation can block a connection in spite of the availability of sufficient amount of spectrum for the connection and deteriorate the network performance.

To restore a network in its optimal state and enhance the blocking performance, several network defragmentation schemes are investigated [2][3][4]. However, in order to make timely judgments on when to defragment the network and to verify the effectiveness of network defragmentation or resource provisioning solutions, there is a need to accurately measure the network state. Thus, the problem is how to quantify the fragmentation in a network. The problem is formally defined as follows.

We are given an optical network topology G(V, E), where V is a set of reconfigurable optical add-drop multiplexer (ROADM) nodes and E is a set of fibers connecting ROADM nodes. The network supports a set of line rates L. The required spectral width for each line rate is $H_1$ GHz for a line rate l. The network offers total Z GHz of spectrum to support the network traffic. A connection demand requesting a line rate l between a set of nodes arrive with probability $Q_l$. The problem is how to measure spectral fragmentation in the network.

In [5], a Spectrum Compactness parameter is introduced to quantify fragmentation over a fiber based on the occupied and available spectrum slots. In [6], Utilization Entropy parameter is introduced to evaluate fragmentation over a fiber based on the number of changes in the states of spectrum. Both of these parameters do not consider fiber correlations while measuring network fragmentation.

REFERENCES

[1] ITU-T G.694.1, "Spectral grids for WDM applications: DWDM frequency grid," May 2002.
[2] A. N. Patel, P. N. Ji, J. P. Jue, and T. Wang, "Defragmentation of Transparent Flexible Optical WDM (FWDM) Networks," Proceeding of OFCNFOEC, no. OTuI8, March 2011.
[3] F. Cugini, M. Secondini, N. Sambo, G. Bottari, G. Bruno, P. Iovanna, and P. Castoldi, "Push-Pull Technique for Defragmentation in Flexible Optical Networks," Proceeding of OFCNFOEC, no. JTh2A.40, March 2012.
[4] K. Wen, Y. Yin, D. Geisler, S. Chang, and S. J. Ben Yoo, "Dynamic On-demand Lightpath Provisioning Using Spectral Defragmentation in Flexible Bandwidth Networks," Proc. of ECOC, no. Mo.2.K.4, 2011.
[5] X. Yu, J. Zhang, Y. Zhao, T. Peng, Y. Bai, D. Wang, and X. Lin, "Spectrum Compactness based Defragmentation in Flexible Bandwidth Optical Networks," Proc. of OFCNFOEC, no. JTh2A.35, 2012.
[6] X. Wang, Q. Zhang, I. Kim, P. Palacharla, and M. Sekiya, "Utilization Entropy for Assessing Resource Fragmentation in Optical Networks," Proc. of OFCNFOEC, no. OTh1A.2, 2012.

BRIEF SUMMARY OF THE INVENTION

An objective of the present invention is to measure fragmentation in a network to evaluate and design methods to efficiently provision spectral resources.

An aspect of the present invention includes a method implemented in a network apparatus used in a wavelength division multiplexing (WDM) optical network. The method includes (a) finding K-shortest routes between each node pair (s, d), where s, d∈V and |V|≤K, where V is a set of reconfigurable optical add-drop multiplexer (ROADM) nodes, (b) selecting unconsidered node pair (s, d), (c) selecting unconsidered route k between nodes s and d out of the K-shortest routes, (d) finding a bit map of route k by performing bit-wise logical AND operation on bit vectors of fibers along route k, (e) selecting unconsidered line rate l out of offered set L of line rates, and (f) finding a probability $\alpha_l^{s,d,k}$ of provisioning a connection with line rate l.

Another aspect of the present invention includes a network apparatus used in a wavelength division multiplexing (WDM) optical network. The network apparatus includes (a) a first finding means for finding K-shortest routes between each node pair (s, d), where s, d∈V and |V|≤K, where V is a set of reconfigurable optical add-drop multiplexer (ROADM) nodes, (b) a first selection means for selecting unconsidered node pair (s, d), (c) a second selection means for selecting unconsidered route k between nodes s and d out of the K-shortest routes, (d) a second finding means for finding a bit map of route k by performing bit-wise logical AND operation on bit vectors of fibers along route k, (e) a third selection means for selecting unconsidered line rate l out of offered set L of line rates, and (f) a third finding means for finding a probability $\alpha_l^{s,d,k}$ of provisioning a connection with line rate l.

Still another aspect of the present invention includes a wavelength division multiplexing (WDM) optical network. The WDM optical network includes a network apparatus, wherein the network apparatus (a) finds K-shortest routes between each node pair (s, d), where s, d∈V and |V|≤K, where V is a set of reconfigurable optical add-drop multiplexer (ROADM) nodes, (b) selects unconsidered node pair (s, d), (c) selects unconsidered route k between nodes s and d out of the K-shortest routes, (d) finds a bit map of route k by performing bit-wise logical AND operation on bit vectors of fibers along route k, (e) selects unconsidered line rate l out of offered set L of line rates, and (f) finds a probability $\alpha_l^{s,d,k}$ of provisioning a connection with line rate l.

Means herein can comprise one or more of various kinds of components such as, for example, software, a computer program, an electronic device, a computer, and/or a dedicated controller.

DETAILED DESCRIPTION

When connections are routed with the wavelength and spectral continuity constraints over multiple fibers, the available and occupied spectrum in the fibers are correlated. The states of fibers are correlated. We design a novel procedure that takes into account the correlations of fiber states to measure network fragmentation.

Figure 1A:
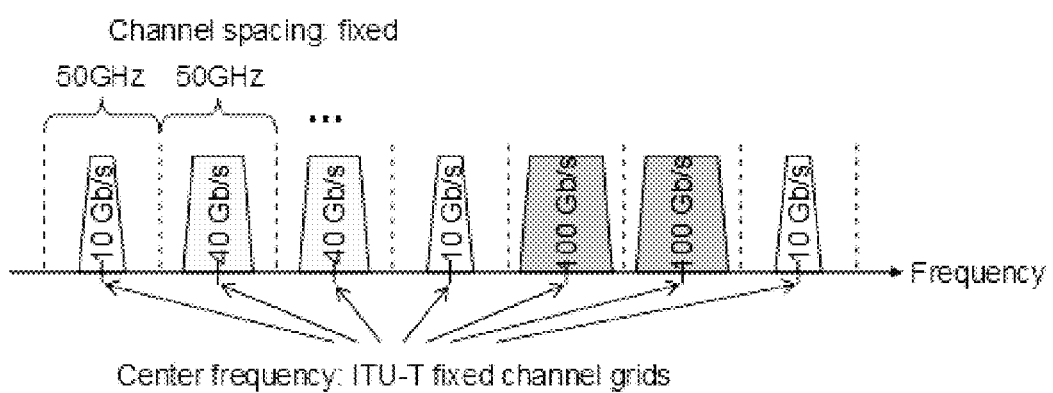
FIG. 1(a) depicts channel spacing of a fixed grid WDM network.
Figure 1B:
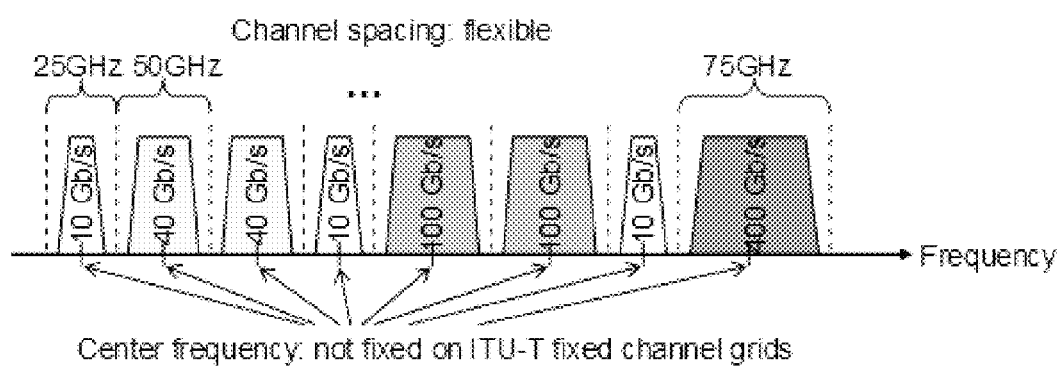
FIG. 1(b) depicts channel spacing of a flexible WDM network.
Figure 2:
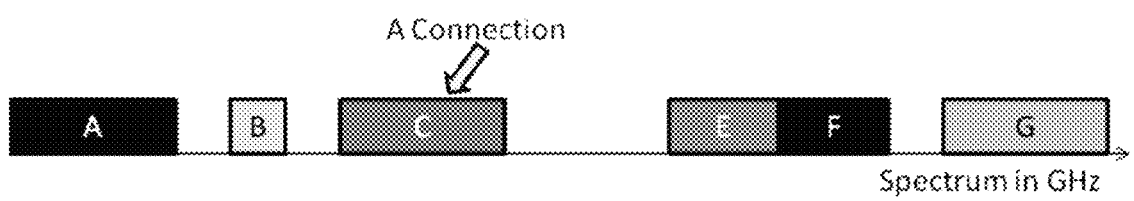
FIG. 2 depicts fragmentation in the spectrum of a fiber.
Figure 3:
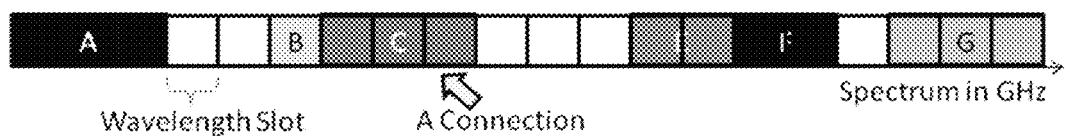
FIG. 3 depicts spectral islands and wavelenght slots in the fragmented spectrum.

To reduce the management complexity, the spectrum is slotted at the granularity of T GHz. A slot is referred to as a wavelength slot as shown in FIG. 3. Thus, spectrum can be represented by a set of consecutive wavelength slots, and among them, the first wavelength slot index is denoted as wavelength. Thus, the network consists of total $$F = \left\lceil \frac{Z}{T} \right\rceil$$

wavelength slots. The state of each wavelength slot is represented by a binary variable; '1' indicated that the wavelength slot is available and '0' indicates that the wavelength slot is occupied. The spectrum state of a fiber is represented by a binary vector.

The procedure first finds up to K-shortest routes between each pair of nodes, where |V|≤K. Next, the procedure finds binary spectrum state along each route k between each pair of nodes (s, d), which is referred to as bit-map of a route. The bit-map of a route is found by performing bit-wise logical-AND operations on the bit vectors of all fibers along the route. Based on the available spectrum island (defined as a set of consecutive available wavelength slots) and the required spectrum for each line rate, the procedure finds the probability of provisioning a connection with a line rate l on a route k between an (s, d) node pair, $\alpha_l^{s,d,k}$. Finally, using this probability of provisioning a connection with a line rate l on a route k between an (s, d) node pair, $\alpha_l^{s,d,k}$, and the probability of requesting a line rate l, $Q_l$, the procedure determines the fragmentation factor FF of the network.

Figure 4:
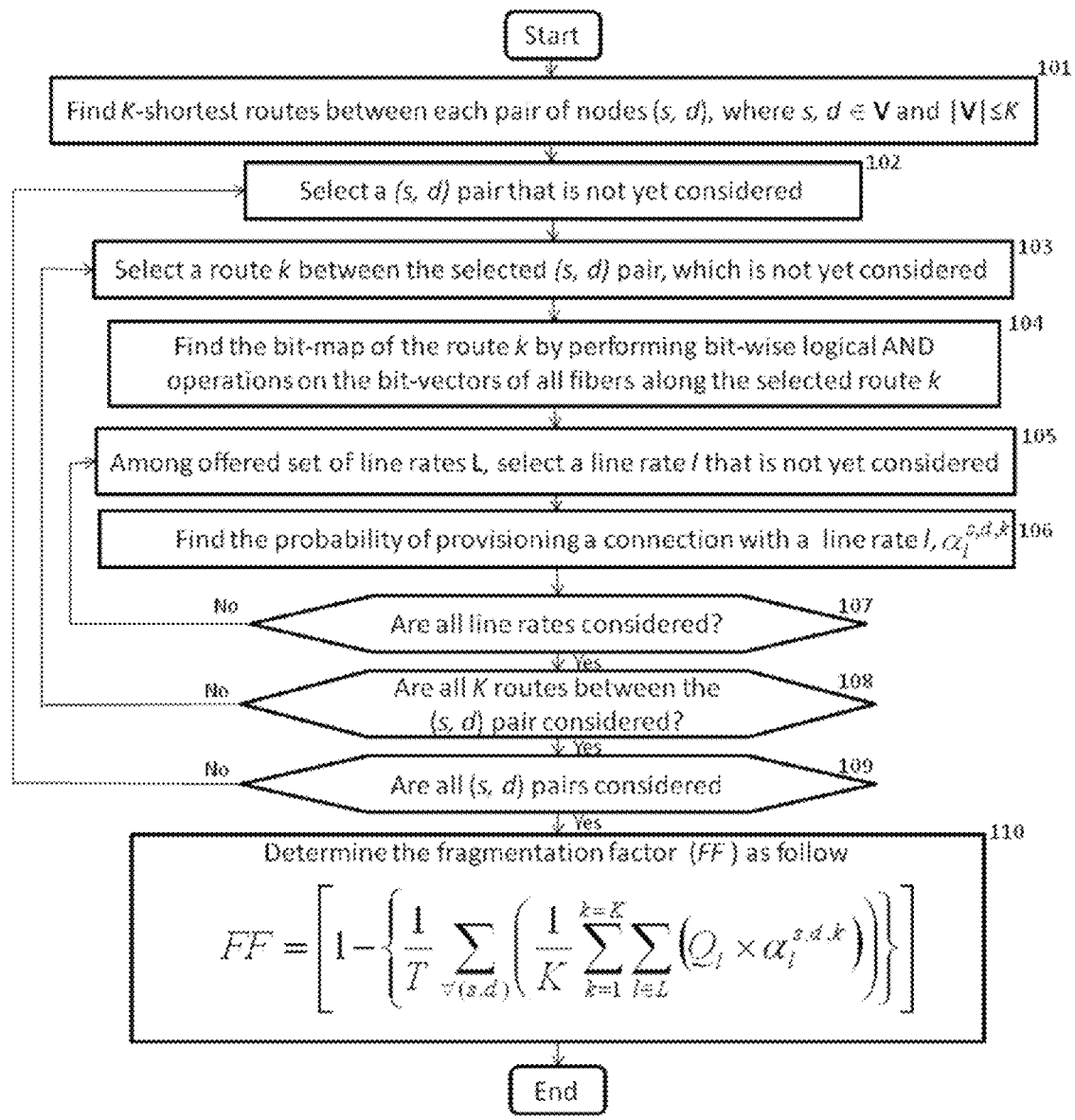
FIG. 4 depicts a flowchart of the procedure to measure network fragmentation.

The detail procedure is described in terms of the flow chart as shown in FIG. 4 as follows:

In Step 101, the procedure finds K-shortest routes between each pair of nodes (s, d), where s, d∈V and |V|≤K.

In Step 102, the procedure selects a pair of nodes (s, d) that is not yet considered.

In Step 103, among the K-shortest routes between the selected pair of nodes, the procedure selects a route k that is not yet considered.

In Step 104, the procedure finds the bit-map of the selected route k by performing bit-wise logical-AND operations on the bit vectors of fibers along the selected route.

In Step 105, the procedure selects a line rate l that is not yet considered among the offered set of line rates L.

In Step 106, the procedure finds the probability of provisioning a connection with line rate l on a route k between a (s, d) node pair, $\alpha_l^{s,d,k}$.

In Step 107, the procedure checks whether all line rates are considered. If all line rates are already considered, then the procedure follows Step 108, otherwise the procedure repeats Step 105.

In Step 108, the procedure checks whether all K-shortest routes between the (s, d) pair are taken into account. If at least one of the routes is not yet considered, then the procedure repeats Step 103, otherwise the procedure follows Step 109.

In Step 109, the procedure checks whether all possible (s, d) pairs of the network are taken into account. If at least one (s, d) pair is not yet considered, then the procedure repeats Step 102, otherwise the procedure follows Step 110.

In Step 110, the procedure determines the fragmentation factor of the network using the probability of provisioning a connection for each possible line rates on each of the K-shortest routes between each node pairs and the probability of requesting a line rate l, and finally the procedure is terminated. The fragmentation factor is determined as follows:

$$FF = \left[ 1 - \left\{ \frac{1}{T} \sum_{\forall (s,d)} \left( \frac{1}{K} \sum_{k=1}^{k=K} \sum_{l \in L} \left( Q_l \times \alpha_l^{s,d,k} \right) \right) \right\} \right]$$

(1) The procedure accurately measures fragmentation in a network compared to the existing approaches.
(2) The procedure is used to evaluate and design methods to efficiently provision spectral resources.
(3) The procedure is applicable in the optical control plane, such as Path Computation Element (PCE), OpenFlow controller, and distributed controllers at nodes.
(4) The procedure is applicable to timely make decisions on network defragmentation.

(5) The application of this procedure can enhance network performance in terms of higher spectral efficiency and lower connection blocking.

The methods disclosed herein can be implemented in a network apparatus.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a network apparatus used in a wavelength division multiplexing (WDM) optical network, the method comprising:
    (a) finding K-shortest routes between each node pair (s, d), where s, d∈V and |V|≤K, where V is a set of reconfigurable optical add-drop multiplexer (ROADM) nodes;
    (b) selecting unconsidered node pair (s, d);
    (c) selecting unconsidered route k between nodes s and d out of the K-shortest routes;
    (d) finding a bit map of route k by performing bit-wise logical AND operation on bit vectors of fibers along route k;
    (e) selecting unconsidered line rate l out of offered set L of line rates; and
    (f) finding a probability $\alpha_l^{s,d,k}$ of provisioning a connection with line rate l.

2. The method as in claim 1, further comprising:
    (g) iterating steps (e) and (f) until all line rates in offered set L are considered.

3. The method as in claim 2, further comprising:
    (h) iterating steps (c) to (g) until all of the K-shortest routes between node pair (s, d) are considered.

4. The method as in claim 3, further comprising:
    (i) iterating steps (b) to (h) until all node pairs are considered.

5. The method as in claim 4, further comprising:
    (j) determining fragmentation factor (FF) according to the following formula:

$$FF = \left[1 - \left\{\frac{1}{T}\sum_{\forall(s,d)}\left(\frac{1}{K}\sum_{k=1}^{k=K}\sum_{l\in L}\left(Q_l \times \alpha_l^{s,d,k}\right)\right)\right\}\right],$$

where T is granularity at which a spectrum is slotted, and $Q_l$ is a probability of requesting line rate l.

6. A wavelength division multiplexing (WDM) optical network comprising:
    a network apparatus,
    wherein the network apparatus
    (a) finds K-shortest routes between each node pair (s, d), where s, d∈V and |V|≤K, where V is a set of reconfigurable optical add-drop multiplexer (ROADM) nodes,
    (b) selects unconsidered node pair (s, d),
    (c) selects unconsidered route k between nodes s and d out of the K-shortest routes,
    (d) finds a bit map of route k by performing bit-wise logical AND operation on bit vectors of fibers along route k,
    (e) selects unconsidered line rate l out of offered set L of line rates, and
    (f) finds a probability $\alpha_l^{s,d,k}$ of provisioning a connection with line rate l.

7. The WDM optical network as in claim 6, wherein the network apparatus
    (g) iterates steps (e) and (f) until all line rates in offered set L are considered.

8. The WDM optical network as in claim 7, wherein the network apparatus
    (h) iterates steps (c) to (g) until all of the K-shortest routes between node pair (s, d) are considered.

9. The WDM optical network as in claim 8, wherein the network apparatus (i) iterates steps (b) to (h) until all node pairs are considered.

10. The WDM optical network as in claim 9, wherein the network apparatus
    (j) determines fragmentation factor (FF) according to the following formula:

$$FF = \left[1 - \left\{\frac{1}{T}\sum_{\forall(s,d)}\left(\frac{1}{K}\sum_{k=1}^{k=K}\sum_{l\in L}\left(Q_l \times \alpha_l^{s,d,k}\right)\right)\right\}\right],$$

where T is granularity at which a spectrum is slotted, and $Q_l$ is a probability of requesting line rate l.

* * * * *